(12) United States Patent
Shitara et al.

(10) Patent No.: US 11,392,138 B2
(45) Date of Patent: Jul. 19, 2022

(54) VEHICLE, INFORMATION PROCESSING DEVICE, EMERGENCY SUPPORT METHOD, AND INFORMATION PROCESSING METHOD

(71) Applicant: TOYOTA JIDOSHA KABUSHIKI KAISHA, Toyota (JP)

(72) Inventors: Masaki Shitara, Nagakute (JP); Hiromichi Dogishi, Nagoya (JP); Keiji Yamashita, Nisshin (JP); Nozomi Kaneko, Nagoya (JP); Naoki Yamamuro, Nagoya (JP); Shunsuke Tanimori, Susono (JP); Ryoichi Shiraishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/725,576

(22) Filed: Dec. 23, 2019

(65) Prior Publication Data

US 2020/0225680 A1  Jul. 16, 2020

(30) Foreign Application Priority Data

Jan. 15, 2019 (JP) .............................. JP2019-004616

(51) Int. Cl.
*G05D 1/02* (2020.01)

(52) U.S. Cl.
CPC ... *G05D 1/0276* (2013.01); *G05D 2201/0213* (2013.01)

(58) Field of Classification Search
CPC ......... G05D 1/0276; G05D 2201/0213; G05D 1/0088; G08G 1/202; H04W 4/90; G08B 27/001; G06Q 10/047; G06Q 10/06311; G06Q 10/08355; G06Q 50/26
See application file for complete search history.

(56) References Cited

U.S. PATENT DOCUMENTS

| 2004/0039504 A1* | 2/2004 | Coffee .................... B28C 9/00 |
| | | 701/482 |
| 2018/0217598 A1 | 8/2018 | Kuhara |
| 2019/0188493 A1* | 6/2019 | Tiziani .............. B60W 50/0098 |

FOREIGN PATENT DOCUMENTS

| JP | 08-087699 A | 4/1996 |
| JP | 2014-019301 A | 2/2014 |
| JP | 2017-226373 A | 12/2017 |
| JP | 2018-116409 A | 7/2018 |
| JP | 2018-124676 A | 8/2018 |

* cited by examiner

*Primary Examiner* — Rodney A Butler
(74) *Attorney, Agent, or Firm* — Oblon, McClelland, Maier & Neustadt, L.L.P.

(57) ABSTRACT

A vehicle that is able to travel autonomously includes a control unit configured to perform: stopping a first service and executing a second service of emergency support when the emergency has occurred during execution of the first service; and executing movement to a predetermined position associated with the second service. An information processing device includes a control unit configured to perform: detecting occurrence of an emergency; and instructing a vehicle, which is able to travel autonomously and which is located in a predetermined range including an area in which the emergency has occurred, to stop a first service which is being executed and to execute a second service of emergency support.

14 Claims, 10 Drawing Sheets

FIG. 5

VEHICLE INFORMATION MANAGEMENT TABLE

| VEHICLE ID | NORMAL SERVICE | EMERGENCY SERVICE 1 | EMERGENCY SERVICE 2 | SERVICE STATUS | POSITION INFORMATION |
|---|---|---|---|---|---|
| V001 | DELIVERY | TRANSPORTATION OF RESOURCES | TEMPORARY DWELLING | TRANSPORTATION OF RESOURCES | |
| V002 | DELIVERY | EXTINGUISHMENT | SUPPLY OF WATER | SUPPLY OF WATER | |
| V003 | TRANSPORTATION OF PERSON | MOBILE BASE STATION | WATER PURIFICATION | STANDBY | |

FIG. 6

REQUEST MANAGEMENT TABLE (SHELTER A)

| TYPE | NUMBER OF REQUESTED VEHICLES | DISPATCH VEHICLE LIST |
|---|---|---|
| SUPPLY OF WATER | 3 | V006, V007, V009 |
| SUPPLY OF POWER | 2 | V011, V014 |
| TEMPORARY DWELLING | 10 | V004, V012, ... |

VEHICLE, INFORMATION PROCESSING DEVICE, EMERGENCY SUPPORT METHOD, AND INFORMATION PROCESSING METHOD

INCORPORATION BY REFERENCE

The disclosure of Japanese Patent Application No. 2019-004616 filed on Jan. 15, 2019 including the specification, drawings and abstract is incorporated herein by reference in its entirety.

BACKGROUND

1. Technical Field

The disclosure relates to a vehicle, an information processing device, an emergency support method, and an information processing method.

2. Description of Related Art

A management device that determines whether luggage is to be delivered to a delivery destination by an automatically driven vehicle depending on whether parking and stopping of a vehicle are prohibited in a delivery destination area corresponding to delivery destination information of luggage when designation of a luggage delivering method using an automatically driven vehicle is received from a client terminal is disclosed (for example, see Japanese Patent Application Publication No. 2018-124676 (JP 2018-124676 A)).

SUMMARY

An aspect of the disclosure provides a vehicle that can travel autonomously and be effectively utilized and an information processing device, an emergency support method, and an information processing method that can effectively utilize a vehicle which can travel autonomously.

According to an aspect of the disclosure, there is provided a vehicle which is able to travel autonomously, the vehicle including a control unit configured to perform: stopping a first service and executing a second service of emergency support when an emergency has occurred during execution of the first service; and executing movement to a predetermined position associated with the second service.

According to another aspect of the disclosure, there is provided an information processing device including a control unit configured to perform: detecting occurrence of an emergency; and instructing a vehicle, which is able to travel autonomously and which is located in a predetermined range including an area in which the emergency has occurred, to stop a first service which is being executed and to execute a second service of emergency support.

According to another aspect of the disclosure, there is provided an emergency support method of causing a vehicle, which is able to travel autonomously, to perform: stopping a first service and executing a second service of emergency support when an emergency has occurred during execution of the first service; and executing movement to a predetermined position associated with the second service.

According to another aspect of the disclosure, there is provided an information processing method causing an information processing device to perform: detecting occurrence of an emergency; and instructing a vehicle, which is able to travel autonomously and which is located in a predetermined range including an area in which the emergency has occurred, to stop a first service which is being executed and to execute a second service of emergency support.

According to one aspect of the present disclosure, it is possible to effectively utilize an autonomously traveling vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating an example of a vehicle information management table in the center server;

FIG. 6 is a diagram illustrating an example of a request management table in the center server;

DETAILED DESCRIPTION OF EMBODIMENTS

Figure 1:
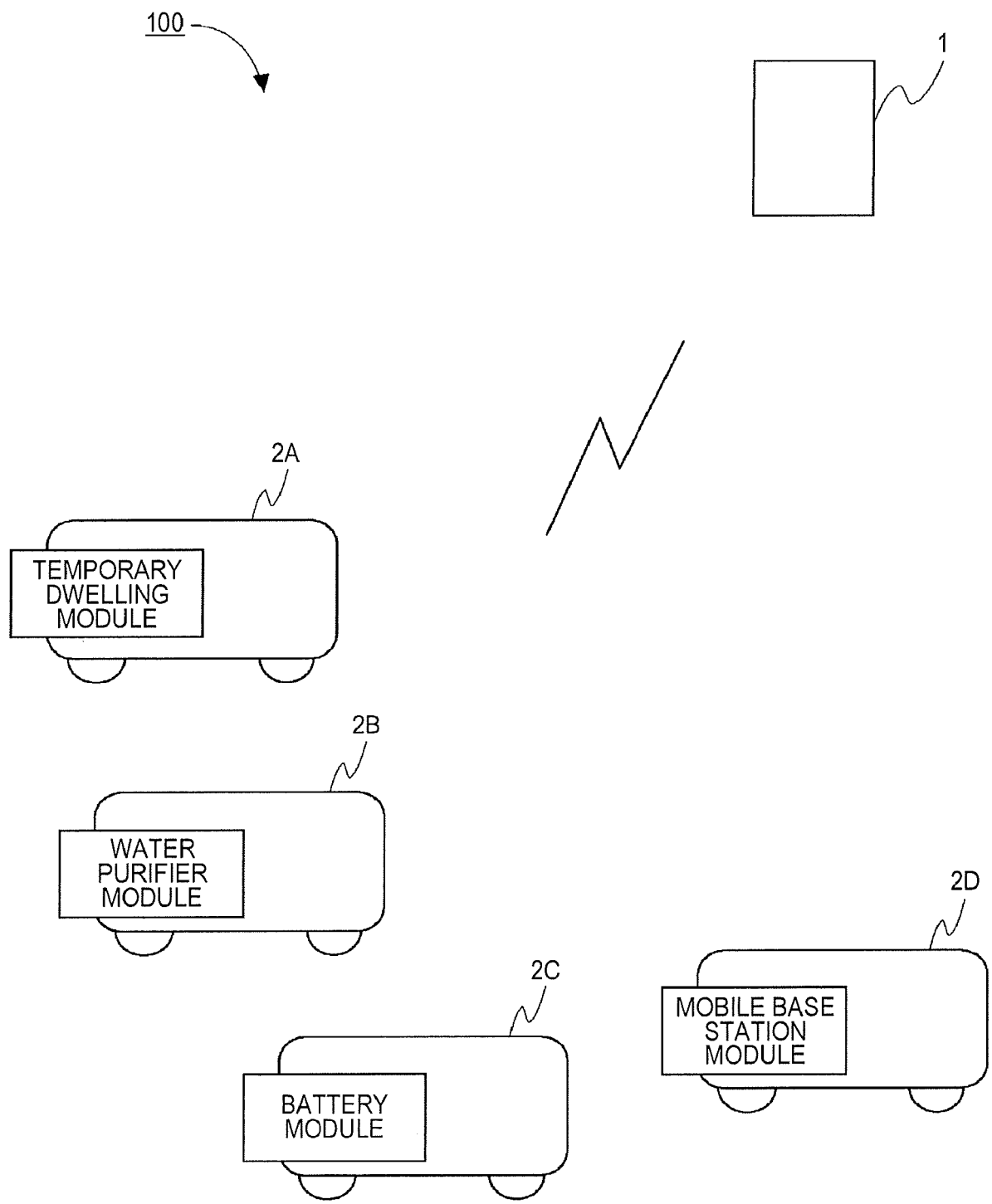
FIG. 1 is a diagram illustrating an example of a system configuration of an emergency support control system according to a first embodiment.

An aspect of the disclosure is a vehicle that is able to travel autonomously. The vehicle includes a control unit configured to perform: stopping a first service and executing a second service of emergency support when an emergency has occurred during execution of the first service; and executing movement to a predetermined position associated with the second service. Another aspect of the disclosure provides an information processing device including a control unit configured to perform: detecting occurrence of an emergency; and instructing a vehicle, which is able to travel autonomously and which is located in a predetermined range including an area in which the emergency has occurred, to stop a first service which is being executed and to execute a second service of emergency support.

Examples of an emergency include natural disasters such as an earthquake, a tsunami, a flood, an avalanche, and heavy rainfall and man-made disasters such as a fire, an explosion, terrorism, a dispute, and a traffic accident. The first service is, for example, a service which is assigned to vehicles in a normal state. Examples of the first service include but are not limited to delivery of luggage, transportation of a person, a mobile shop, and patrol monitoring.

Examples of the second service include but are not limited to provision of a water wagon, provision of a water purifier vehicle, provision of an ambulance, provision of a fire truck, transportation of resources, delivery of a power supply, provision of a temporary dwelling, and provision of a mobile base station. The first service and the second service may include standby. In one aspect, the word "service" is synonymous with words such as "processing," "role," and "work," and may be replaced with such words.

Since a vehicle which is executing a first service stops the first service and executes a second service of emergency support when an emergency has occurred, for example, dedicated vehicles for emergency support do not need to be prepared and thus it is possible to effectively utilize vehicles. By causing vehicles that can travel autonomously and are located in a predetermined range including an area in which the emergency occurs to stop the first service and to execute the second service of emergency support, it is possible to provide the second service of emergency support more rapidly to persons who are affected by the emergency.

In one aspect of the disclosure, the vehicle may include a sensor that detects a surrounding environment, and the control unit of the vehicle may detect occurrence of an emergency from data acquired from the sensor. Examples of the sensor that detects the surrounding environment include but are not limited to a camera, an obstacle sensor, a temperature sensor, a humidity sensor, an acceleration sensor, and a seismic intensity meter. Accordingly, a vehicle itself can perform detection of occurrence of an emergency, stopping of a first service, and execution of a second service.

In one aspect of the disclosure, the control unit of the vehicle may receive an instruction from a predetermined server that manages emergency support in a predetermined range and execute the second service which is assigned by the predetermined server. The predetermined server manages a broader range and can provide a more appropriate second service to a position with more demand by causing the predetermined server to assign the second service to the vehicle.

In the aspect in which the control unit of the vehicle receives an instruction from the predetermined server that manages support of an emergency in the predetermined range and executes a second service which is assigned by the predetermined server, the control unit of the vehicle may determine a second service which is to be executed and execute the determined second service when communication with the predetermined server is cut off. Accordingly, even when communication with the predetermined server is cut off due to occurrence of an emergency, the vehicle can autonomously execute the second service.

In one aspect of the disclosure, the control unit of the vehicle may execute a third service of emergency support, which is requested from the predetermined position and is to be executed by the vehicle, when the second service ends. The second service and the third service may have the same details or different details. Whether there is a third service which is requested from the predetermined position and whether the vehicle is able to execute the third service may be determined, for example, by the vehicle or by an information processing device. Accordingly, when the second service is completed, the vehicle can continuously provide a third service of emergency support at the position and thus can save, for example, a moving distance of the vehicle or a time in which another vehicle moves to execute the third service, whereby it is possible to allow a vehicle to efficiently operate.

The disclosure may also be understood as an emergency support method. The emergency support method includes causing a vehicle, which is able to travel autonomously, to perform: stopping a first service and executing a second service of emergency support when an emergency has occurred during execution of the first service; and executing movement to a predetermined position associated with the second service. The above-mentioned technical concept for a vehicle can also be applied to the emergency support method as long as no technical contradictions arise.

Hereinafter, embodiments of the disclosure will be described with reference to the accompanying drawings. The configurations of the following embodiments are only examples and the disclosure is not limited to the configurations of the embodiments.

First Embodiment

Outline of System

FIG. 1 is a diagram illustrating an example of a system configuration of an emergency support control system 100 according to a first embodiment. The emergency support control system 100 is a system that causes a vehicle which can travel autonomously to move to an area in which an emergency has occurred and to execute a service of emergency support when the emergency has occurred. Examples of an emergency include natural disasters such as an earthquake, heavy rainfall, a flood, a tsunami, an avalanche, and heavy snowfall and man-made disasters such as a large-scale fire, an explosion, terrorism, a dispute, and a traffic accident. Examples of a service of emergency support which is executed by a vehicle which can travel autonomously include transportation of resources, provision of a water wagon, provision of a water purifier vehicle, provision of a fire truck, provision of an ambulance, provision of a power supply, provision of a mobile base station, and provision of a temporary dwelling.

The emergency support control system 100 includes vehicles 2 and a center server 1 that controls the vehicles 2. In FIG. 1, the emergency support control system 100 includes a vehicle 2A, a vehicle 2B, a vehicle 2C, and a vehicle 2D. When the vehicles are not particularly distinguished from each other, the vehicles are simply referred to as vehicles 2. The center server 1 is an example of an "information processing device."

Each vehicle 2 is, for example, a vehicle that can travel by automated driving and by unmanned driving. A module which is used for a service of emergency support is mounted in each vehicle 2. A module is a set of tools, implements, facilities, or the like which are used to execute a predetermined service. For example, the vehicle 2A has a temporary dwelling module mounted therein. A temporary dwelling module includes, for example, a camp bed and a portable toilet, and the vehicle 2A can be used as a simple dwelling by unfolding the temporary dwelling module in the vehicle. For example, the vehicle 2B has a water purifier module mounted therein. A water purifier module includes a water purifier. Water such as rainwater or well water can be purified into drinking water or water which is used for daily activities by using the water purifier module. For example, the vehicle 2C has a battery module mounted therein and provides a power supply. For example, the vehicle 2D may have a mobile base station module mounted therein and serve as a mobile base station.

Each of the plurality of vehicles 2 is connected to the center server 1, for example, via a radio communication network. For example, each of the plurality of vehicles 2 may be connected to the Internet via a radio communication network and may be connected to the center server 1 via the Internet. Each vehicle 2 performs, for example, mobile communication such as 3G, Long Term Evolution (LTE), or LTE-Advanced, radio communication based on a standard of wireless LAN such as WiFi, or dedicated short-range communications (DSCR).

Each vehicle 2 receives an operation command from the center server 1, makes an operation plan, and travels autonomously to a destination in accordance with the operation plan. The vehicle 2 includes a unit that acquires position information, acquires position information at intervals of a predetermined period, and transmits the acquired position information to the center server 1. The vehicle 2 executes, for example, services such as delivery of luggage, patrol on a predetermined route, or a mobile shop. A service which is executed in a normal state by each vehicle 2 is hereinafter referred to as a normal service. The normal service is an example of a "first service."

In the first embodiment, for example, each vehicle 2 determines a surrounding environment from detected values from a plurality of types of sensors mounted therein at intervals of a predetermined period and determines whether an emergency has occurred. Examples of the sensor which is used to detect occurrence of an emergency include a camera, a seismic intensity meter, an acceleration sensor, a temperature sensor, and a humidity sensor. When occurrence of an emergency is detected, the vehicle 2 transmits a notification to the center server 1.

The center server 1 detects occurrence of an emergency from a notification from each vehicle 2, or emergency news from a predetermined institution. For example, the center server 1 identifies vehicles 2 which are located in an area in which the emergency has occurred and an area in the vicinity thereof, assigns services of emergency support to the vehicles 2 based on statuses of services supported by the vehicles 2 and requests from the area, and instructs the vehicles to stop the normal services and to execute the services of emergency support. In the following description, a service of emergency support is referred to as an emergency service. The emergency service is an example of a "second service."

When an instruction to stop a normal service and an instruction to execute an emergency service are received from the center server 1, each vehicle 2 stops the normal service it is executing and starts execution of the instructed emergency service. Examples of the emergency service which is executed by each vehicle 2 include provision of a water wagon, provision of a water purifier vehicle, transportation of resources, provision of a temporary dwelling, provision of a power supply, and provision of a mobile base station. Each vehicle 2 moves to a position which is designated by the center server 1 and executes the instructed emergency service.

In the first embodiment, since vehicles 2 which are located in an area in which an emergency has occurred and an area in the vicinity thereof execute emergency services, it is possible to provide emergency services to an affected area more rapidly. Since each vehicle 2 is a vehicle which executes a normal service in a normal state, dedicated vehicles 2 for emergency services do not need to be prepared and the vehicles 2 can be efficiently utilized.

For example, it is conceivable that communication between a vehicle 2 and the center server 1 may be cut off when an emergency has occurred. In the first embodiment, a vehicle 2 detects occurrence of an emergency using a sensor which is provided in the vehicle and determines whether a predetermined emergency service is to be executed when communication with the center server 1 is cut off. Accordingly, even when communication between the vehicle 2 and the center server 1 is cut off due to occurrence of an emergency, the vehicle 2 can stop a normal service and execute an emergency service.

Figure 2:
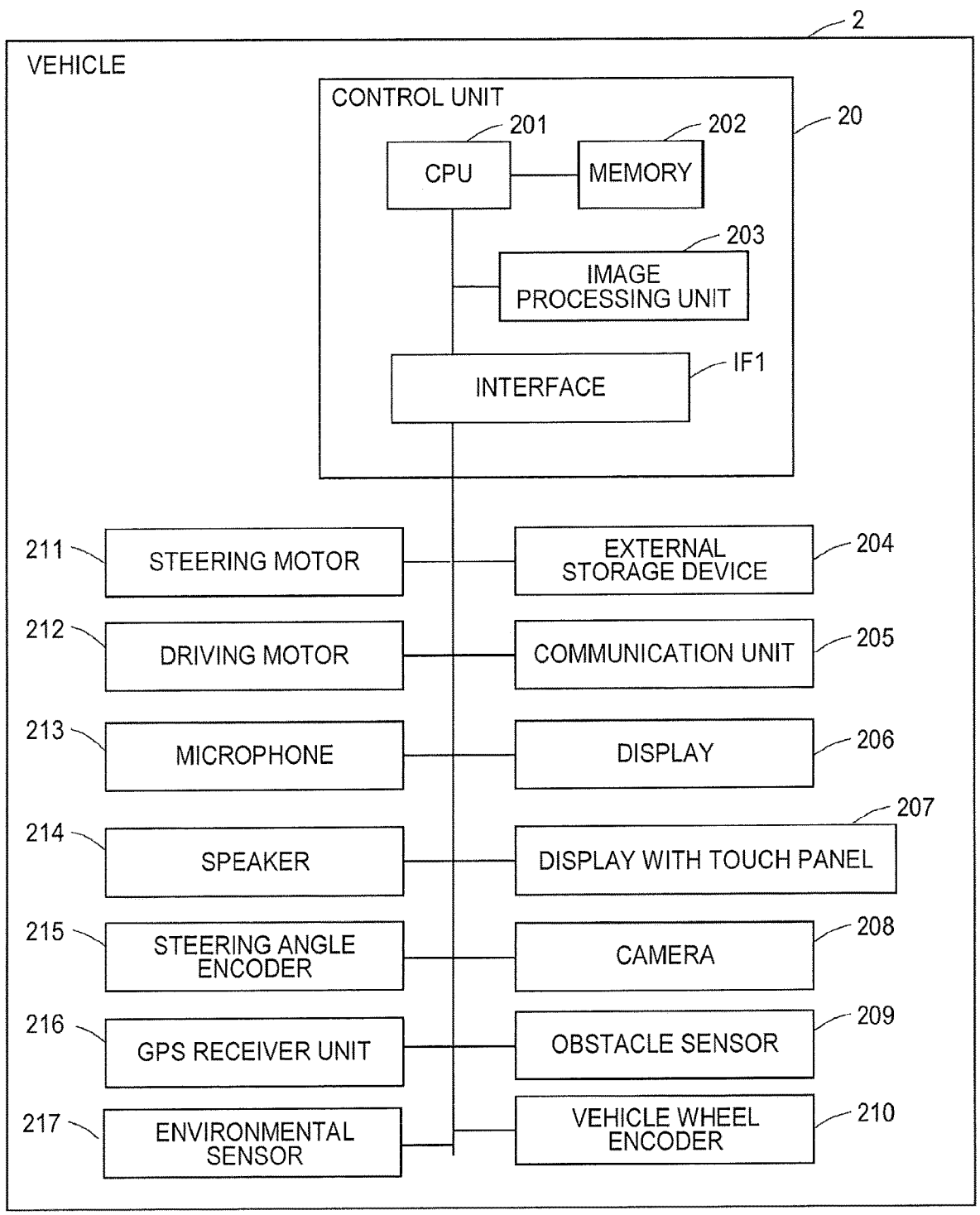
FIG. 2 is a diagram illustrating an example of a hardware configuration of a vehicle.

FIG. 2 is a diagram illustrating an example of a hardware configuration of a vehicle 2. In FIG. 2, it is assumed that the vehicle 2 is a vehicle which can travel autonomously. In FIG. 2, hardware associated with a control system is extracted and illustrated.

The vehicle 2 includes a control unit 20, an external storage device 204, a communication unit 205, a display 206, a display 207 with a touch panel, a camera 208, an obstacle sensor 209, a vehicle wheel encoder 210, a steering motor 211, a driving motor 212, a microphone 213, a speaker 214, a steering angle encoder 215, a Global Positioning System (GPS) receiver unit 216, and an environmental sensor 217.

The control unit 20 is also called an engine control unit (ECU). The control unit 20 includes a CPU 201, a memory 202, an image processing unit 203, and an interface IF1. The external storage device 204, the communication unit 205, the display 206, the display 207 with a touch panel, the camera 208, the obstacle sensor 209, the vehicle wheel encoder 210, the steering motor 211, the driving motor 212, the microphone 213, the speaker 214, the steering angle encoder 215, the GPS receiver unit 216, and the environmental sensor 217 are connected to the interface IF1.

The environmental sensor 217 is a sensor that detects a surrounding environment of the vehicle 2. Examples of the environmental sensor 217 include a temperature sensor, a seismic intensity sensor, an acceleration sensor, a gyro sensor, and a noise sensor. The environmental sensor 217 may include a camera.

The obstacle sensor 209 is, for example, an ultrasonic sensor or a radar. The obstacle sensor 209 emits ultrasonic waves, radio waves, or the like in a detection direction and detects the presence, position, relative speed, and the like of an obstacle in the detection direction based on reflected waves. Examples of the obstacle include a pedestrian, a bicycle, a structure, and a building. For example, when the vehicle 2 has a box-shaped body, the vehicle 2 includes a plurality of obstacle sensors 209 and the plurality of obstacle sensors 209 are provided at positions close to four corners on front, rear, right, and left sides of the vehicle 2. Front, rear, right, and left sides of the vehicle 2 are determined, for example, depending on a traveling direction thereof.

The camera 208 is an imaging device using an image sensor such as a charge-coupled device (CCD) or a metal-oxide semiconductor (MOS) or complementary metal-oxide-semiconductor (CMOS). The camera 208 acquires an image at intervals of a predetermined time which is called a frame period and stores the acquired images in a frame buffer in the control unit 20. The vehicle 2 includes a plurality of cameras 208, and the plurality of cameras 208 is provided, for example, on the surfaces of the front, rear, right, and left sides of the vehicle 2 to face the outside. Here, the disclosure is not limited thereto and the camera 208 may include a camera that is provided to face the inside of the vehicle. A viewing angle, an imaging range, and the like of the camera 208 can be set within predetermined ranges.

The steering motor 211 controls a direction of a cross line at which a rotary surface of a vehicle wheel and a horizontal surface cross each other, that is, an angle which is a traveling direction based on rotation of the vehicle wheel, in accordance with an instruction signal from the control unit 20.

The driving motor 212 drives and rotates, for example, four vehicle wheels of the vehicle 2 in accordance with an instruction signal from the control unit 20. Here, the driving motor 212 may drive a pair of vehicle wheels out of two front and rear pairs of vehicle wheels.

The steering angle encoder 215 detects a steering angle which is the traveling direction of the vehicle wheels at intervals of a predetermined detection time and stores the detected steering angle in a register of the control unit 20. A steering angle is an angle of a rotation shaft of a vehicle wheel in the horizontal plane. For example, an origin of the angle is set in a direction perpendicular to the rotation shaft of the vehicle wheel with respect to the traveling direction of the vehicle 2. The vehicle wheel encoder 210 acquires a rotary angle of the vehicle wheel at intervals of a predetermined detection time and stores the acquired rotary angle in the register of the control unit 20.

The communication unit 205 is a communication unit that accesses an access point of WiFi or a mobile phone base station and communicates with various servers over a network via a public communication circuit network connected thereto. The communication unit 205 performs radio communication in a radio signal and radio communication mode supporting a predetermined radio communication standard.

The GPS receiver unit 216 receives radio waves of time signals from a plurality of global positioning satellites which orbits the earth and stores the received time signals in the register in the control unit 20. The microphone 213 detects voice, converts the detected voice into a digital signal, and stores the digital signal in the register in the control unit 20. The speaker 214 is activated by the control unit 20 or a D/A converter and an amplifier which are connected to a signal processing unit and reproduces sound including sound and voice. The microphone 213 and the speaker 214 may include a microphone and a speaker which are provided to face the inside of the vehicle 2 and a microphone and a speaker which are provided to face the outside of the vehicle 2.

For example, the display 206 is provided on at least one side surface of the body of the vehicle 2 to face the outside of the vehicle 2. Examples of the display 206 include a liquid crystal display and an electroluminescence panel.

The display 207 with a touch panel is an input device to which a user inputs an instruction and is provided, for example, to face the inside of the vehicle 2. The disclosure is not limited thereto and the display 207 with a touch panel may be provided in the vicinity of a door of the vehicle 2 to face the outside of the vehicle 2.

The CPU 201 of the control unit 20 executes a computer program which is executably loaded into the memory 202 and performs processes of the control unit 20. The memory 202 stores a computer program which is executed by the CPU 201, data which is processed by the CPU 201, and the like. Examples of the memory 202 include a dynamic random access memory (DRAM), a static random access memory (SRAM), and a read only memory (ROM). The image processing unit 203 processes data in the frame buffer which is acquired at intervals of a predetermined frame period from the camera 208 in cooperation with the CPU 201. The image processing unit 203 includes, for example, a GPU and an image memory which serves as a frame buffer. The external storage device 204 is a nonvolatile storage device and examples thereof include a solid state drive (SSD) and a hard disk drive. The CPU 201 is an example of a "control unit" of a "vehicle."

For example, the control unit 20 acquires detection signals from the sensors of various parts of the vehicle 2 via the interface IF1. The control unit 20 calculates latitude and longitude indicating a position on the earth based on the detection signal from the GPS receiver unit 216. In addition, the control unit 20 acquires map data from a map information database stored in the external storage device 204, compares the calculated latitude and longitude with a position in the map data, and determines a current position. The control unit 20 acquires a route from the current position to a destination in the map data. The control unit 20 detects an obstacle near the vehicle 2 based on the signals from the obstacle sensor 209, the camera 208, and the like, determines the traveling direction to avoid the obstacle, and controls the steering angle.

The control unit 20 processes images acquired from the camera 208 for each piece of frame data in cooperation with the image processing unit 203, detects, for example, change based on a difference between the images, and recognizes an obstacle. The control unit 20 may transmit frame data of the images from the camera 208 and voice data acquired from the microphone 213 to the center server 1 over the network via the communication unit 205. Then, analysis of the frame data of the images and the voice data may be shared by the center server 1.

In addition, the control unit 20 displays an image, characters, and other information on the display 206. The control unit 20 detects an operation on the display 207 with a touch panel and receives an instruction from a user.

The vehicle 2 may include, for example, a module of an emergency service or a normal service in addition to the hardware configuration illustrated in FIG. 2. The module includes machines, tools, implementations, and facilities which are used for each service. The module is connected to the vehicle 2, for example, via a connector, whereby control or supply of power by the CPU 201 of the vehicle 2 is possible.

In FIG. 2, the interface IF1 is illustrated, but transmission and reception of signals between the control unit 20 and a control object is not limited to the interface IF1. That is, the control unit 20 may have a plurality of signal transmission paths other than the interface IF1. In FIG. 2, the control unit 20 includes a single CPU 201. Here, the CPU is not limited to a single processor but may have a multi-processor configuration. A single CPU which is connected to a single socket may have a multi-core configuration. At least some processes of the units may be performed by a processor other than the CPU, for example, a dedicated processor such as a digital signal processor (DSP) or a graphics processing unit (GPU). At least some processes of the units may be performed by an integrated circuit (IC) or another digital circuit. An analog circuit may be included as at least a part of each unit.

Figure 3:
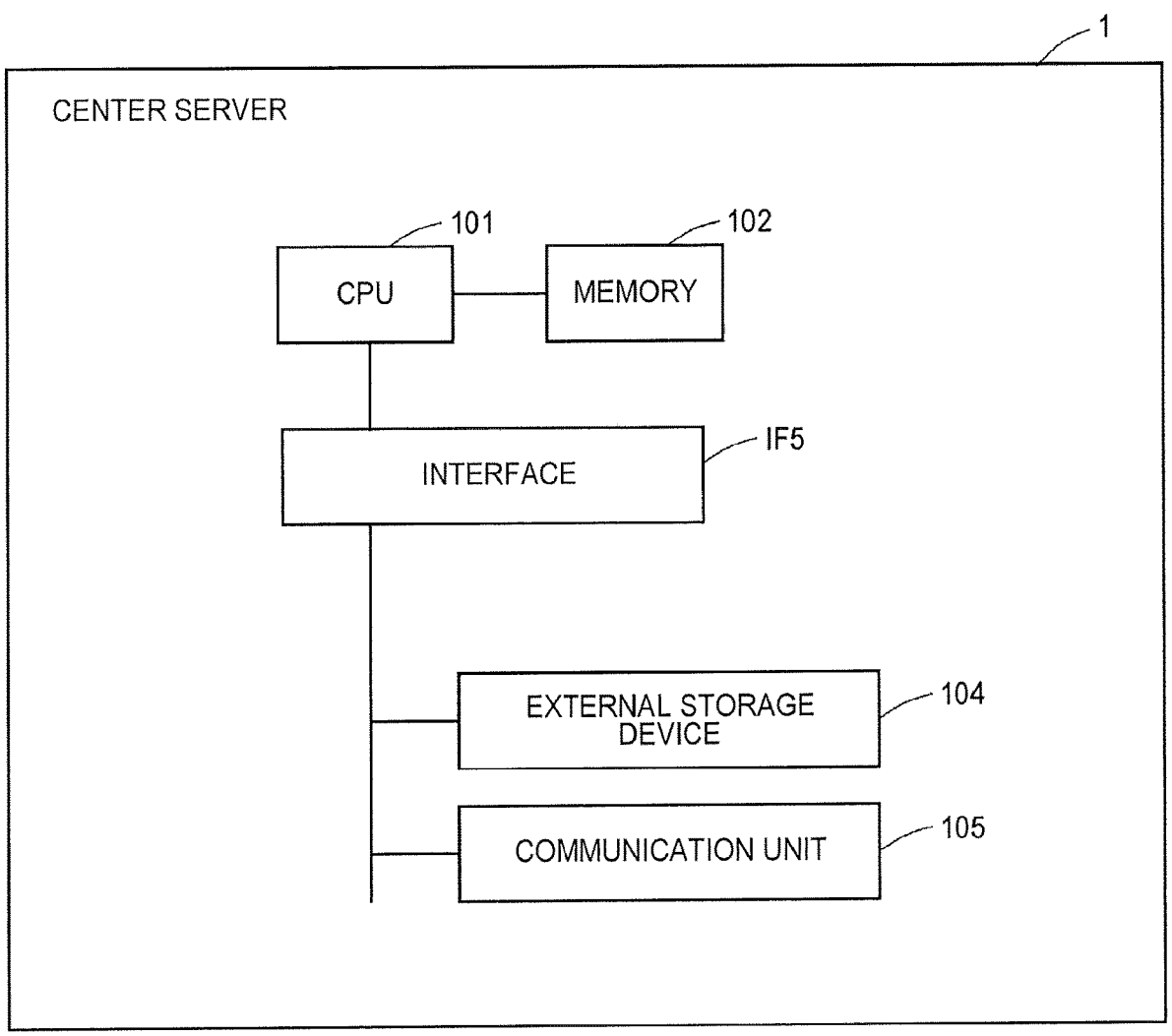
FIG. 3 is a diagram illustrating a hardware configuration of a center server.

FIG. 3 is a diagram illustrating a hardware configuration of the center server 1. The center server 1 includes a CPU 101, a memory 102, an interface IF5, an external storage device 104, and a communication unit 105. The configurations and operations of the CPU 101, the memory 102, the interface IF5, and the external storage device 104 are the same as those of the CPU 201, the memory 202, the interface iF1, and the external storage device 204 which are illustrated in FIG. 2. The CPU 101 is an example of a "control unit" of an "information processing device."

The communication unit 105 accesses, for example, a public communication circuit network via a LAN and communicates with various servers and vehicles 2 over the network via the public communication circuit network. The hardware configuration of the center server 1 is not limited to that illustrated in FIG. 3 and can be appropriately subjected to additions or substitutions depending on embodiments.

Figure 4:
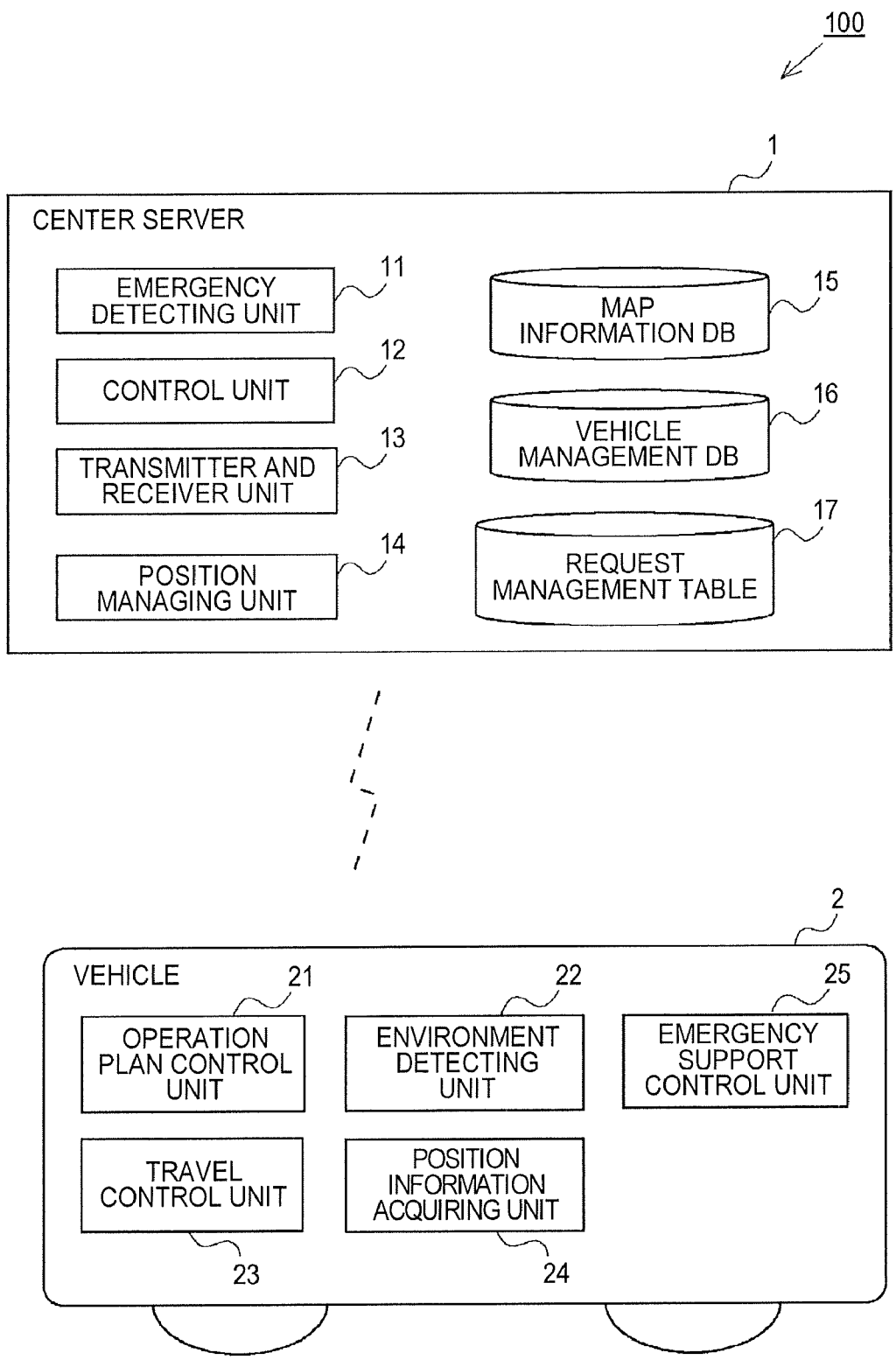
FIG. 4 is a diagram illustrating an example of functional configurations of the center server and the vehicle in the emergency support control system.

FIG. 4 is a diagram illustrating an example of functional configurations of the center server 1 and the vehicle 2 in the emergency support control system 100. The center server 1 operates as the units which are illustrated in FIG. 4 in accordance with a computer program in the memory 102. That is, the center server 1 includes an emergency detecting unit 11, a control unit 12, a transmitter and receiver unit 13, a position managing unit 14, a map information database (DB) 15, a vehicle management DB 16, and a request management table 17 as the functional elements.

The transmitter and receiver unit 13 is an interface with vehicles 2 and various servers. The transmitter and receiver unit 13 outputs information received via the communication unit 105 to the emergency detecting unit 11, the control unit 12, and the position managing unit 14. The transmitter and receiver unit 13 transmits information input from the emergency detecting unit 11, the control unit 12, and the position managing unit 14 to a designated destination via the communication unit 105.

The emergency detecting unit 11 detects occurrence of an emergency. Specifically, the emergency detecting unit 11 detects occurrence of an emergency based on a notification received from a vehicle 2 which has detected occurrence of an emergency, emergency news received from a predetermined public institution and/or a predetermined news medium, and the like. The notification indicating occurrence of an emergency from a vehicle 2 and the emergency news received from a predetermined public institution or a predetermined news medium include, for example, a type and an occurrence position of an emergency and a state of damage. When occurrence of an emergency is detected, the emergency detecting unit 11 outputs a notification indicating occurrence of an emergency to the control unit 12. A method of detecting occurrence of an emergency in the emergency detecting unit 11 is not limited to a particular method and any known method may be used.

The control unit 12 receives a notification indicating occurrence of an emergency from the emergency detecting unit 11, for example, identifies vehicles 2 which are caused to support the emergency, and assigns emergency services to the identified vehicles 2. The vehicles 2 which are caused to support the emergency are identified, for example, based on position information and service execution statuses of the vehicles 2 which are stored in the vehicle management DB 16 which will be described later. Assignment of emergency services to the vehicles 2 is performed, for example, based on information on requests for emergency services which is stored in the request management table 17 which will be described later.

The control unit 12 transmits an instruction to stop a normal service and an instruction to execute the assigned emergency services to the identified vehicles 2. Information including destinations and transit points of the vehicles 2 and service details in the destinations and the transit points are also transmitted depending on the types of the emergency services. For example, when the type of an emergency service is a service requiring supply such as supply of water or transportation of resources, information on supply positions which are transit points and information on a water supply position or a resource provision position which is a destination are transmitted. For example, when the type of an emergency is a service not particularly requiring supply such as provision of a temporary dwelling, provision of an ambulance, or provision of a mobile base station, information on a destination is transmitted.

A position which is a destination of each vehicle 2 is, for example, a position at which an emergency has occurred, a source of request for emergency services, or a shelter which is determined in advance. Information on shelters is stored, for example, in the map information DB 15.

The control unit 12 receives a request for emergency services, for example, from a vehicle 2 or a predetermined public institution via the transmitter and receiver unit 13. Examples of the predetermined public institution include a public office, a fire station, and a police station. The request from a vehicle 2 is input, for example, by operating the display 207 with a touch panel of the vehicle 2 and is transmitted from the vehicle 2 via the network. The request for emergency services includes, for example, types of emergency services which are to be requested, a request position, the number of requests. The control unit 12 stores the received request for emergency services in the request management table 17 which will be described later.

The position managing unit 14 receives position information of a vehicle 2 which is transmitted from the vehicle 2 at intervals of a predetermined period via the transmitter and receiver unit 13. The position managing unit 14 stores position information of the vehicle 2 in the vehicle management DB 16 which will be described later. For example, when the position information is not received from the vehicle 2 in a predetermined period, the position managing unit 14 may detect cut-off of communication with the vehicle 2.

The map information DB 15, the vehicle management DB 16, and the request management table 17 are prepared in the external storage device 104 of the center server 1. The map information DB 15 and the vehicle management DB 16 are, for example, relational databases.

For example, map information with a range which is managed by the center server 1, position information of a shelter, and position information such as supply positions of resources (which include water) are stored in the map information DB 15. For example, information on vehicles 2 is stored in the vehicle management DB 16. Details of information stored in the vehicle management DB 16 will be described later. For example, information on requests for emergency services is stored in the request management table 17. Details of the request management table 17 will be described later.

One functional unit or some processes of the center server 1 may be executed by another computer which is connected to the network. A series of processes which are performed by the center server 1 may be embodied in hardware or may be embodied in software.

A vehicle 2 operates as the units illustrated in FIG. 4 in accordance with a computer program in a memory. For example, the vehicle 2 includes an operation plan control unit 21, an environment detecting unit 22, a travel control unit 23, a position information acquiring unit 24, and an emergency support control unit 25 as functional units. The operation plan control unit 21, the environment detecting unit 22, the travel control unit 23, the position information acquiring unit 24, and the emergency support control unit 25 are, for example, functional units which are embodied by causing the CPU 201 to execute a program in the memory 202.

The position information acquiring unit 24 acquires, for example, position information of the vehicle 2 which is acquired by a GPS receiver unit 216 or the like at intervals of a predetermined period and transmits the acquired position information to the center server 1. The position information of the vehicle 2 is, for example, latitude and longitude. Alternatively, the position information of the vehicle 2 may be, for example, an address. The position information of the vehicle 2 which is acquired by the position information acquiring unit 24 is also output to, for example, the operation plan control unit 21 and the travel control unit 23.

The operation plan control unit 21 receives an operation command from the center server 1. The operation plan control unit 21 calculates a route on which the vehicle 2 is to travel based on the position information of the host vehicle acquired by the position information acquiring unit 24 and creates an operation plan. The operation plan includes data on the calculated route on which the vehicle 2 is to travel and data in which processes which are to be performed by the vehicle 2 in a part or a whole of the route are defined. An example of the process which is to be performed by the vehicle 2 is change of a direction of the vehicle 2. The operation plan control unit 21 outputs the created operation plan to the travel control unit 23.

The environment detecting unit 22 detects environment information around the vehicle 2 which is used to travel autonomously based on data which is acquired by various sensors mounted in the vehicle 2. Examples of an object which is to be detected by the environment detecting unit 22 include information such as the number or positions of lanes, the number or positions of vehicles which are located near the host vehicle, the number or positions of obstacles (for example, pedestrians, bicycles, structures, or buildings) which are located near the host vehicle, a structure of a road, and road signs. The object to be detected is not limited thereto. The object to be detected is not particularly limited as long as it is used to perform autonomous travel. For example, when a sensor is a stereo camera, an object near the vehicle 2 is detected by processing image data which are captured by the stereo camera. Data on the surrounding environment of the vehicle 2 which is detected by the environment detecting unit 22 is output to the travel control unit 23 which will be described later.

The travel control unit 23 generates a control command for controlling autonomous travel of the host vehicle, for example, based on the operation plan which is created by the operation plan control unit 21, the data on the surrounding environment of the vehicle 2 which is generated by the environment detecting unit 22, and the position information of the host vehicle which is acquired by the position information acquiring unit 24. For example, when an operation plan is input from the operation plan control unit 21, the travel control unit 23 determines whether there is an obstacle in a moving direction indicated by the operation plan and secures safety of movement. When it is determined that there is no obstacle in the moving direction, the travel control unit 23 generates a control command such that the host vehicle can travel on a route indicated by the operation plan. The generated control command is transmitted to the driving motor 212. A known method can be employed as the method of generating the control command for causing the vehicle to travel autonomously.

The emergency support control unit 25 performs a process of detecting occurrence of an emergency at intervals of a predetermined period. Specifically, the emergency support control unit 25 detects environment information near the vehicle 2 based on data acquired by the environmental sensor 217 mounted in the vehicle 2, and determines whether an emergency has occurred. For example, an object which is to be detected by the emergency support control unit 25 includes image data captured by the camera 208 and a seismic intensity, a temperature, a humidity, and a water level detected by the environmental sensor 217. For example, when the temperature, the seismic intensity, the humidity, and the water level are equal to or greater than threshold values indicating abnormality, the emergency support control unit 25 detects an emergency. For example, when collapse of a building, disruption of a road, rising in water level, a fallen person, or the like is detected by causing the image processing unit 203 to analyze the image data captured by the camera 208, the emergency support control unit 25 detects an emergency. The method of detecting an emergency using the emergency support control unit 25 is not limited to a specific method and any known method may be used.

When occurrence of an emergency has been detected, the emergency support control unit 25 transmits a notification indicating occurrence of an emergency to the center server 1. For example, position information of the vehicle 2 as an occurrence position is also transmitted along with the notification indicating occurrence of an emergency. When a type of an emergency is specified from data acquired by the environmental sensor 217, the type of an emergency is also transmitted along with the notification indicating occurrence of an emergency. When occurrence of an emergency has been detected, the emergency support control unit 25 may broadcast a notification indicating occurrence of an emergency to vehicles 2 which are located near at intervals of a predetermined period by vehicle-to-vehicle communication.

When an instruction to stop a normal service and an instruction to execute an emergency service are received from the center server 1, the emergency support control unit 25 temporarily stops the operation plan control unit 21 and the travel control unit 23 and stops a normal service which is being executed regardless of whether occurrence of an emergency has been detected. In this case, it is assumed that the normal service includes a standby state. Then, the emergency support control unit 25 starts execution of an emergency service which is designated by the center server 1. In the emergency service, a program for supporting the emergency service is stored in the external storage device 204 in advance and the emergency support control unit 25 executes the program of the designated emergency service. By executing the emergency service program, for example, an operation command to a destination designated by the center server 1 is output from the emergency support control unit 25 to the operation plan control unit 21 or a process using a predetermined module or the like is instructed.

When occurrence of an emergency has been detected and cut-off of communication with the center server 1 has been detected, the emergency support control unit 25 collects detailed information of the detected emergency and performs stopping of a normal service and determination of whether execution of a predetermined emergency service is to be started. The collection of detailed information of an emergency is performed, for example, by accessing a server of a predetermined news medium or a public institution other than the center server 1 via the network or acquiring information on the emergency detected by nearby vehicles 2 by vehicle-to-vehicle communication with the vehicles 2. For example, when a notification indicating that occurrence of an emergency has been detected is received from other nearby vehicles 2, when a request for an emergency service is received from other nearby vehicles 2, or when a notification indicating occurrence of an emergency is received from a server of a predetermined news medium or a public institution, the emergency support control unit 25 determines that a normal service should be stopped and execution of a predetermined emergency service should be started. Examples of the predetermined emergency service include a predetermined service and a service which is selected based on collected information by the emergency support control unit 25.

When occurrence of an emergency has been detected and a communication function of a vehicle 2 is out of order such that the vehicle 2 cannot communicate with any server or any vehicle 2 as well as the center server 1, the emergency support control unit 25 executes a predetermined emergency service. An emergency service which is executed in this case may be, for example, any one or a combination of movement to a predetermined shelter, unfolding of a module mounted therein (such as a first-aid module, a water purifier module, or a battery module) such that anyone can use it, displaying of a request screen for an emergency service on the display 207 with a touch panel such that anyone can request an emergency service, and the like.

When it is detected that an emergency service which is being executed is completed, the emergency support control unit 25 transmits a notification indicating completion to the center server 1. For example, an instruction associated with a next service is transmitted from the center server 1. When communication with the center server 1 is cut off, the emergency support control unit 25 sets the vehicle 2 to a standby state. In the standby state, for example, the emergency support control unit 25 sets a state in which a module mounted therein (such as a first-aid module, a water purifier module, or a battery module) is unfolded such that anyone can use it, a state in which a request screen for an emergency service is displayed on the display 207 with a touch panel such that anyone can request an emergency service, or the like.

When completion of an emergency service which is being executed is determined, for example, when a completion operation is input by a user, when an instruction is transmitted from the center server 1, or when exhaustion of resources (such as water, resources, and power) is detected.

For example, when a request for an emergency service is input by receiving a user's operation of the display 207 with a touch panel and the emergency service which is requested can be executed, the emergency support control unit 25 may execute the emergency service. When another emergency service is being executed or the emergency service which is requested cannot be executed, the emergency support control unit 25 may transmit a request for an emergency service to the center server 1.

FIG. 5 is a diagram illustrating an example of a vehicle information management table in the center server 1. The vehicle information management table is stored, for example, in the vehicle management DB 16. The vehicle information management table is a table in which information on vehicles 2 is stored. In the example illustrated in FIG. 5, the vehicle information management table includes fields of vehicle IDs, normal services, emergency services, service statuses, and position information.

Identification information of the vehicles 2 is stored in the field of vehicle IDs. Information indicating types of the normal services of the corresponding vehicles 2 is stored in the fields of normal services. Information indicating the types of the emergency services which can be executed by the corresponding vehicles 2 is stored in the field of emergency services. When a vehicle 2 can execute an emergency service, for example, it means that the vehicle 2 has a module, which is used for the emergency service, mounted therein, that a specific module is not required for the emergency service, or that equipment of the vehicle 2 satisfies conditions for execution of the emergency service. The number of emergency services which can be executed by a vehicle 2 may be one or more. When the number of emergency services which can be executed by the vehicle 2 is one or more, emergency service 1, emergency service 2, . . . may be registered in the order in which execution priority descends.

Information indicating service execution statuses of the corresponding vehicles 2 is stored in the field of service statuses. For example, when a vehicle 2 executes a resource transportation service, information indicating "transportation of resources" is stored in the field of service statuses. For example, when a vehicle 2 is in a standby state, information indicating "standby" is stored in the field of service statuses.

Latest position information of the corresponding vehicles 2 which is transmitted from the vehicles 2 to the center server 1 at intervals of a predetermined period is stored in the field of position information. The field of position information is updated by the position managing unit 14.

Information which is stored in the vehicle information management table is not limited to the information illustrated in FIG. 5. For example, sizes of the vehicles 2, types of mounted modules, and information of mounted equipment may also be stored in the vehicle information management table.

FIG. 6 is a diagram illustrating an example of a request management table 17 in the center server 1. The request management table 17 is created, for example, by the control unit 12 for each position at which a request for an emergency service has been received. For example, the request management table 17 is created for each shelter. The request management table 17 stores information on a request for an emergency service from the corresponding position.

In the example illustrated in FIG. 6, the request management table 17 includes fields of a type, the number of requested vehicles, and a dispatch vehicle list. The types of requested emergency services are stored in the field of a type. The number of vehicles 2 requested for an emergency service of the corresponding type is stored in the field of the number of requested vehicles. The number of requested vehicles may be stored, for example, when it is designated by a received request and may be empty when it is not designated. The number of requested vehicles may be stored when the number of requested vehicles is specified by a predetermined method such as collection of information.

A list of identification information of the vehicles 2 which are executing the emergency services of the corresponding types at the corresponding position is stored in the field of a dispatch vehicle list. In the dispatch vehicle list, for example, identification information of a vehicle 2 is added thereto when an instruction to execute an emergency service is transmitted to the vehicle 2 and the identification information of the vehicle 2 is deleted therefrom when a notification indicating completion of an emergency service is received. Information included in the request management table 17 is not limited to the information illustrated in FIG. 6.

When an emergency has occurred and a request for an emergency service is received, the control unit 12 determines a range for specifying vehicles 2 which are to be dispatched to a position corresponding to the request management table 17, the vehicles 2 which are to be dispatched to the position, emergency services which are to be assigned to the vehicles 2, and the like, for example, based on the map information DB 15, the vehicle information management table illustrated in FIG. 5, and the request management table 17 illustrated in FIG. 6.

Flow of Process Routine

Figure 7:
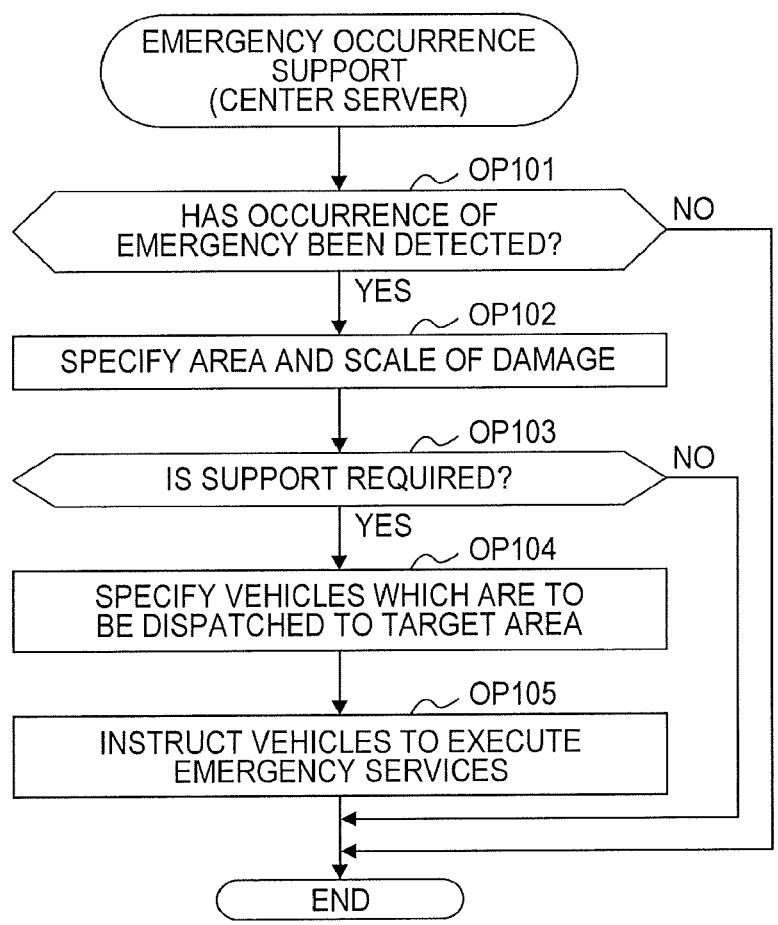
FIG. 7 is a flowchart illustrating an example of an emergency occurrence support process routine in the center server.

FIG. 7 is a flowchart illustrating an example of an emergency occurrence support process routine in the center server 1. The emergency occurrence support process routine is a process routine which is executed when occurrence of an emergency has been detected. The process routine illustrated in FIG. 7 is repeatedly performed, for example, at intervals of a predetermined period. An entity that performs the process routine illustrated in FIG. 7 is the CPU 101 of the center server 1, but the control unit 12 which is a functional unit thereof is described as the entity for the purpose of convenience. The same is true of the following flowcharts illustrating a process routine in the center server 1.

In OP101, the control unit 12 determines whether occurrence of an emergency has been detected. For example, when a notification indicating occurrence of an emergency has been received from one vehicle 2 or when emergency news has been received from any of a predetermined public institution and a predetermined news medium, the determination result of OP101 is positive. For example, when a notification indicating occurrence of an emergency has not been received from one vehicle 2 and when emergency news has not been received from a predetermined public institution and a predetermined news medium, the determination result of OP101 is negative. When occurrence of an emergency has been detected (OP101: YES), the process routine progresses to OP102. When occurrence of an emergency has not been detected (OP101: NO), the process routine illustrated in FIG. 7 ends.

In OP102, the control unit 12 specifies an occurrence position of an emergency, an area including the occurrence position, and a scale of damage. For example, the control unit 12 may estimate an occurrence position and an occurrence area of an emergency and a scale of damage based on notifications of an emergency which is received from a plurality of vehicles 2, information which is issued from a predetermined public institution and a predetermined news medium, and the like. The scale of damage may be quantitated using a predetermined function, for example, based on the number of collapsed dwellings and the number of casualties.

In OP103, the control unit 12 determines whether it is necessary to support an emergency. For example, when the scale of damage is greater than a predetermined threshold value and when the number of requests for an emergency service is greater than a predetermined number, the control unit 12 determines that it is necessary to support an emergency. When it is determined that it is necessary to support an emergency (OP103: YES), the process routine progresses to OP104. When it is determined that it is not necessary to support an emergency (OP103: NO), the process routine illustrated in FIG. 7 ends. Determination of OP103 may be performed after a predetermined time has elapsed.

In OP104, the control unit 12 identifies vehicles 2 which are to be dispatched to a disaster area due to an emergency and assigns emergency services to the vehicles 2. In OP104, a plurality of vehicles 2 may be identified. The vehicles 2 which are to be dispatched to the disaster area due to an emergency are, for example, vehicles 2 which are located in the occurrence area of an emergency specified in OP102 and in the peripheral area thereof. The control unit 12 assigns emergency services, which are requested and can be executed by the vehicles 2, to the vehicles 2 which are located within a predetermined range from a target position, for example, based on the vehicle information management table and the request management table 17.

In OP105, the control unit 12 transmits an instruction to stop a normal service and an instruction to execute the assigned emergency services to the identified vehicles 2. Thereafter, the process routine illustrated in FIG. 7 ends. When a request for an emergency service has been newly received after the process routine illustrated in FIG. 7 has ended, the control unit 12 may perform the processes of OP104 and OP105 in response to the request.

Figure 8:
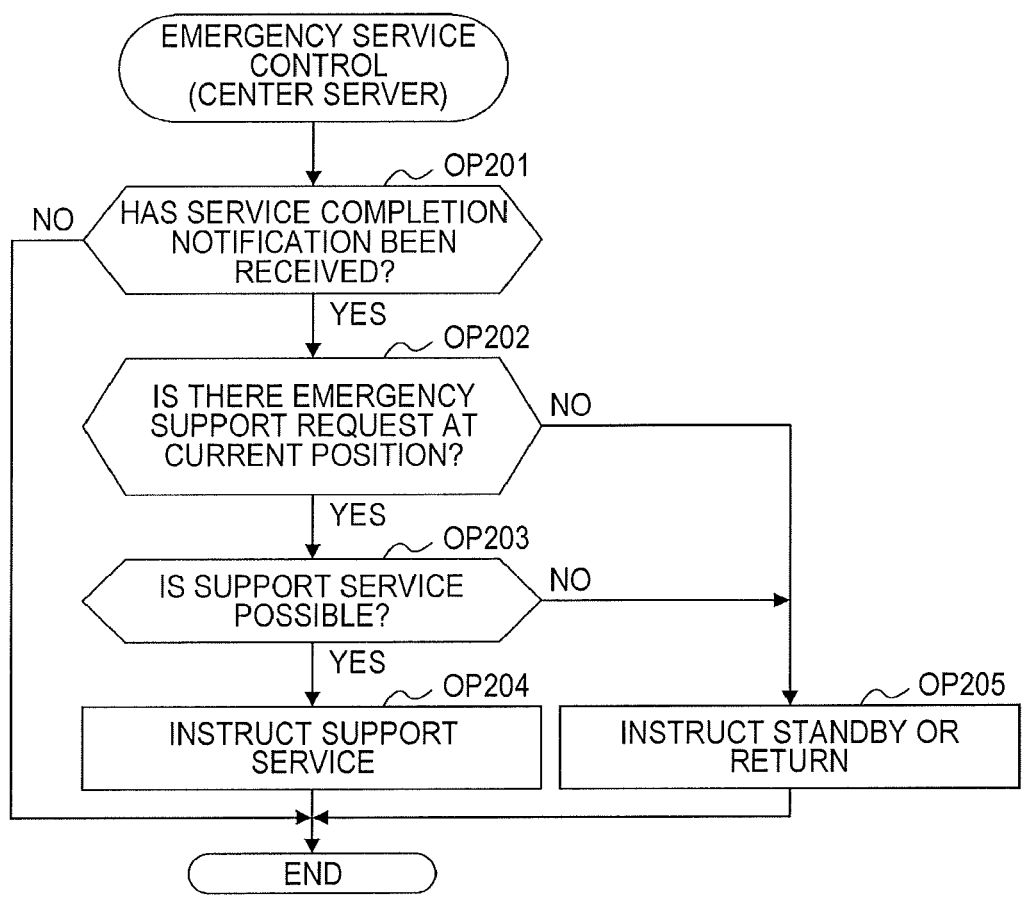
FIG. 8 is a flowchart illustrating an example of an emergency service control process routine in the center server.

FIG. 8 is a flowchart illustrating an example of an emergency service control process routine in the center server 1. The emergency service control process routine is a process of determining whether another emergency service is to be assigned to one vehicle 2 when a notification indicating completion of an emergency service has been received from the vehicle 2. The process routine illustrated in FIG. 8 is repeatedly performed, for example, at intervals of a predetermined period.

In OP201, the control unit 12 determines whether a notification indicating completion of an emergency service has been received from any vehicle 2. When a notification indicating completion of an emergency service has been received from any vehicle 2 (OP201: YES), the process routine progresses to OP202. When a notification indicating completion of an emergency service has not been received from any vehicle 2 (OP201: NO), the process routine illustrated in FIG. 8 ends. Thereafter, in FIG. 8, the vehicle 2 denotes a vehicle 2 which is a transmission source of a notification indicating completion of an emergency service.

In OP202, the control unit 12 determines whether there is a request for an emergency service in the vicinity of the current position of the vehicle 2. The current position of the vehicle 2 is acquired, for example, from the vehicle information management table. Whether there is a request for an emergency service is determined based on the request management table 17. The vicinity of the current position of the vehicle 2 is, for example, a range within a predetermined distance from the vehicle 2 or a range such as a municipality in which the vehicle 2 is located.

When there is a request for an emergency service in the vicinity of the current position of the vehicle 2 (OP202: YES), the process routine progresses to OP203. When there is no request for an emergency service in the vicinity of the current position of the vehicle 2 (OP202: NO), the process routine progresses to OP205.

In OP203, the control unit 12 determines whether the vehicle 2 can execute the emergency service which is requested. When the number of types of emergency services which are requested is two or more, it is determined whether the vehicle 2 can execute at least one type of emergency service thereof. The process of OP203 is performed, for example, based on the vehicle information management table. When the vehicle 2 can execute an emergency which is requested (OP203: YES), the process routine progresses to OP204. When the vehicle 2 cannot execute an emergency service which is requested (OP203: NO), the process routine progresses to OP205.

In OP204, the control unit 12 assigns an emergency service which can be executed by a vehicle 2 out of the emergency services which are requested to the vehicle 2 and transmits an instruction to execute the emergency service to the vehicle 2. Thereafter, the process routine illustrated in FIG. 8 ends.

In OP205, since there is no request for an emergency service in the vicinity of the vehicle 2 or the emergency services which are requested cannot be executed by the vehicle 2, the control unit 12 transmits an instruction to be on standby or an instruction to return to a predetermined position to the vehicle 2. Which of a standby instruction and a return instruction is to be transmitted may be determined, for example, based on the number of non-processed requests and a relationship between the current position of the vehicle 2 and a return position, or any one thereof may be set by a manager. Thereafter, the process routine illustrated in FIG. 8 ends.

The process routine which is performed by the center server 1 is not limited to the process routines illustrated in FIGS. 7 and 8 and can be appropriately modified depending on embodiments.

Figure 9:
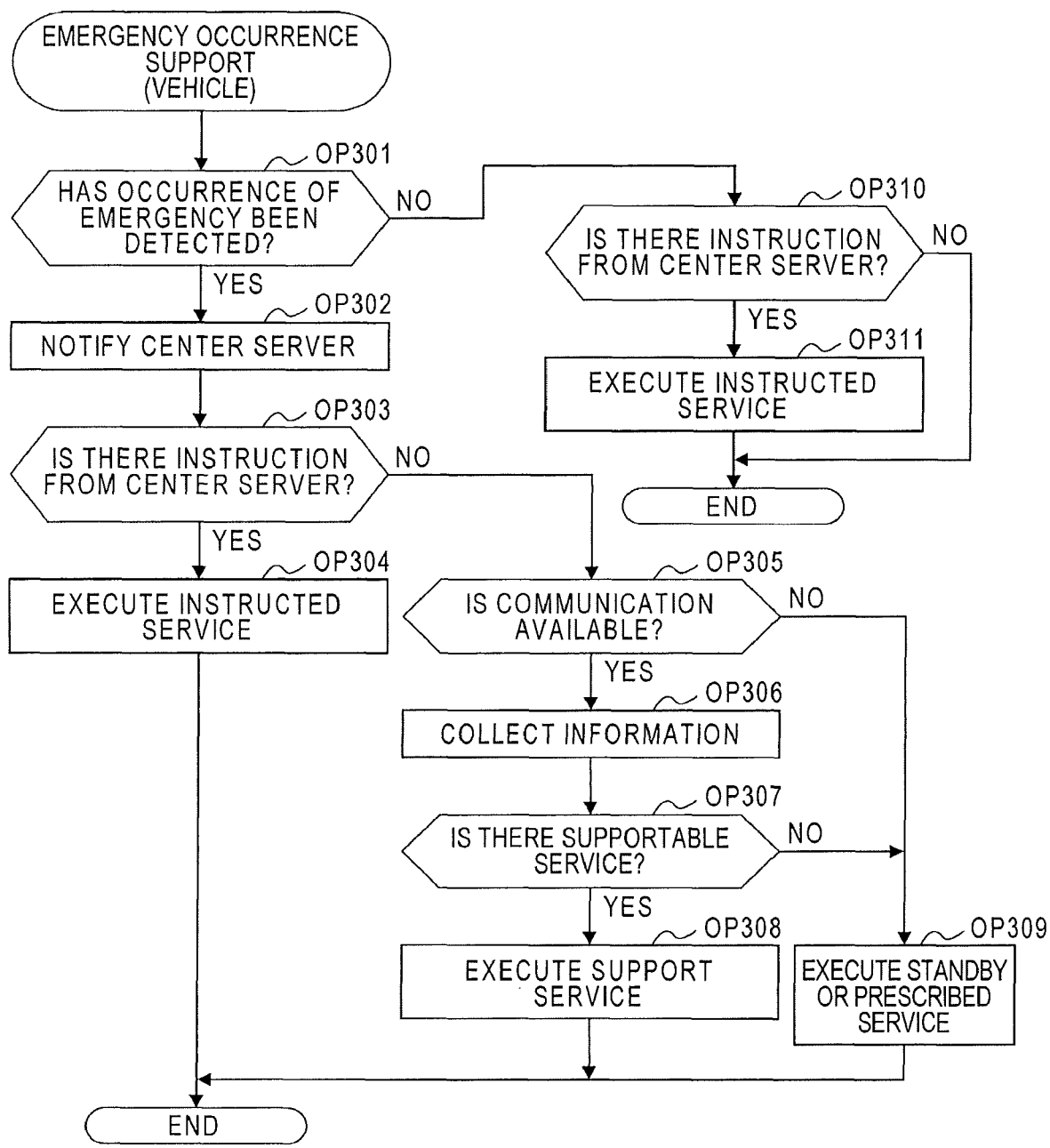
FIG. 9 is a flowchart illustrating an example of an emergency occurrence support process routine in the vehicle.

FIG. 9 is a flowchart illustrating an example of an emergency occurrence support process routine in a vehicle 2. The process routine illustrated in FIG. 9 is repeatedly performed at intervals of a predetermined period. An entity that performs the process routine illustrated in FIG. 9 is the CPU 201, but a functional unit is described as the entity for the purpose of convenience.

In OP301, the emergency support control unit 25 determines whether occurrence of an emergency has been detected. When occurrence of an emergency has been detected (OP301: YES), the process routine progresses to OP302. When occurrence of an emergency has not been detected (OP301: NO), the process routine progresses to OP310.

In OP310, the emergency support control unit 25 determines whether an instruction to execute an emergency service has been received from the center server 1. When an instruction to execute an emergency service has been received from the center server 1 (OP310: YES), the process routine progresses to OP311. When an instruction to execute an emergency service has not been received from the center server 1 (OP310: NO), the process routine illustrated in FIG. 9 ends.

In OP311, the emergency support control unit 25 stops a normal service which is being executed and starts execution of an emergency service which is designated by the center server 1. Thereafter, the process routine illustrated in FIG. 9 ends.

In OP302, since occurrence of an emergency has been detected (OP301: YES), the emergency support control unit 25 transmits a notification indicating occurrence of an emergency to the center server 1.

In OP303, the emergency support control unit 25 determines whether an instruction to execute an emergency service has been received from the center server 1. When an instruction to execute an emergency service has been received from the center server 1 (OP303: YES), the process routine progresses to OP304. In OP304, the emergency support control unit 25 stops a normal service which is being executed and starts execution of an emergency service which is designated by the center server 1. Thereafter, the process routine illustrated in FIG. 9 ends.

When an instruction to execute an emergency service has not been received from the center server 1 (OP303: NO), the process routine progresses to OP305. In OP305, the emergency support control unit 25 determines whether a communication function of the vehicle 2 is available. When the communication function of the vehicle 2 is available (OP305: YES), the process routine progresses to OP306. When the communication function of the vehicle 2 is not available (OP305: NO), the process routine progresses to OP309.

In OP306, since the communication function of the vehicle 2 is available but communication with the center server 1 is cut off, the emergency support control unit 25 collects information associated with an emergency, for example, from other neighboring vehicles 2 or a predetermined server. In OP307, it is determined whether there is an emergency service which can be executed by the vehicle 2 based on the information collected in OP306. For example, when a request for an emergency service has been input by a user, the vehicle 2 broadcasts request information at intervals of a predetermined period by vehicle-to-vehicle communication. By receiving the request information from another vehicle 2 or receiving request information which is transmitted from a predetermined server, determination of OP307 is performed. The emergency support control unit 25 ascertains information of a module which is mounted in the host vehicle and thus ascertains an emergency service which can be executed by the host vehicle.

When there is an emergency service which can be executed by the vehicle 2 (OP307: YES), the process routine progresses to OP308. In OP308, the emergency support control unit 25 starts execution of the emergency service. Thereafter, the process routine illustrated in FIG. 9 ends.

When there is no emergency service which can be executed by the vehicle 2 (OP307: NO), the process routine progresses to OP309. In OP309, the emergency support control unit 25 sets the vehicle 2 to a standby state or executes a prescribed emergency service. For example, when there is no prescribed emergency service, the vehicle 2 may be set to the standby state, or the standby state or a prescribed emergency service may be selected based on environment information near the vehicle 2 which is detected based on data acquired by the environmental sensor 217 mounted in the vehicle 2. Thereafter, the process routine illustrated in FIG. 9 ends.

The process routine in a vehicle 2 illustrated in FIG. 9 is an example and the process routine in the vehicle 2 can be appropriately modified depending on embodiments.

Figure 10:
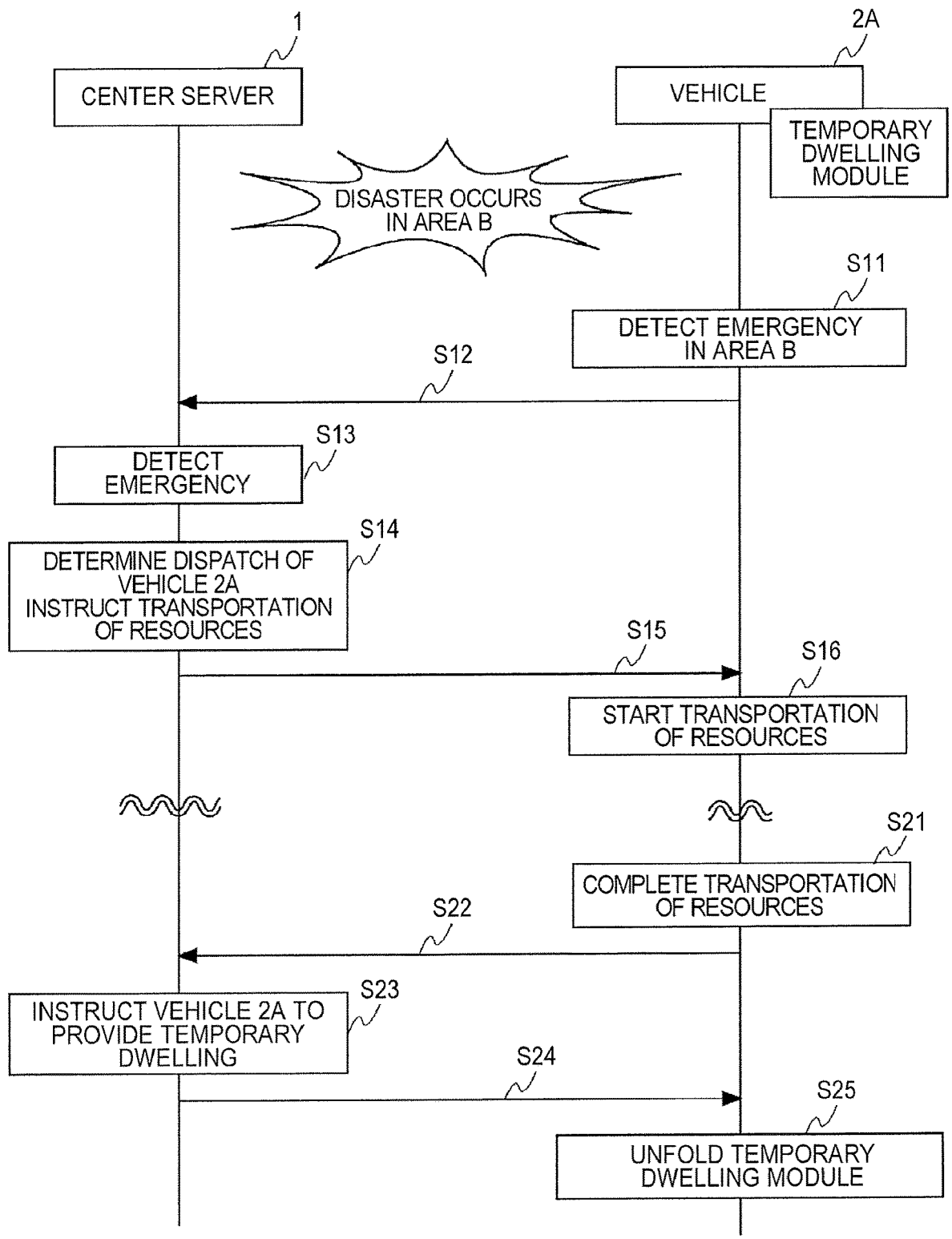
FIG. 10 is a diagram illustrating an example of a sequence of processes in the emergency support control system.

FIG. 10 is a diagram illustrating an example of a sequence of processes in the emergency support control system 100. In FIG. 10, processes between the center server 1 and a vehicle 2A are illustrated for the purpose of simplification of explanation. The vehicle 2A is a vehicle which has a temporary dwelling module mounted therein and can perform transportation of resources and provision of a temporary dwelling as emergency services. In FIG. 10, it is assumed that the vehicle 2A is located in area B and a natural disaster has occurred in area B.

In S11, the vehicle 2A is located in area B, and detects an emergency which has occurred in area B based on data acquired by the environmental sensor 217 mounted in the vehicle 2A (FIG. 9, OP301: YES). In S12, the vehicle 2A transmits a notification indicating occurrence of an emergency to the center server 1 (FIG. 9, OP302) and the center server 1 receives the notification.

In S13, the center server 1 detects occurrence of an emergency in area B by receiving the notification indicating occurrence of an emergency from the vehicle 2A (FIG. 7, OP101: YES). The center server 1 receives a notification indicating occurrence of an emergency from a vehicle 2 other than the vehicle 2A or emergency news from a predetermined institution and thus specifies an occurrence position, an occurrence area, and a scale of damage (FIG. 7, OP102).

In S14, the center server 1 receives a request for an emergency service in area B from any one vehicle 2 or a server of a predetermined institution and assigns dispatch to a predetermined position in the occurrence area of the emergency of the vehicle 2A and transportation of resources thereto as an emergency service to the vehicle 2A (FIG. 7, OP104). In S15, the center server 1 transmits an instruction to stop a normal service and an instruction to execute transportation of resources to the vehicle 2A (FIG. 7, OP105). Information on a supply position of resources as a transit point and a predetermined position (such as a shelter) in the occurrence area of an emergency as a destination is also transmitted.

In S16, the vehicle 2A receives an instruction to execute an emergency service from the center server 1 (FIG. 9, OP303: YES) and starts transportation of resources (FIG. 9, OP304). The vehicle 2A moves to the supply position of resources which is designated as a transit point, loads resources thereinto at the supply position, and moves to a predetermined position (such as a shelter) in the occurrence area of an emergency which is designated as a destination.

In S21, the vehicle 2A completes unloading of resources at the predetermined position in the occurrence area of an emergency and ends a resource transportation service as an emergency service. In S22, the vehicle 2A transmits a notification indicating completion of transportation of resources as an emergency service to the center server 1.

In S23, the center server 1 receives a notification indicating completion of a resource transportation service as an emergency service from the vehicle 2A (FIG. 8, OP201: YES) and determines provision of a temporary dwelling as an emergency service which is to be assigned to the vehicle 2A in the next time (FIG. 8, OP202 to OP203). In S24, the center server 1 transmits an instruction to execute provision of a temporary dwelling as an emergency service to the vehicle 2A (FIG. 8, OP204). For example, a current position of the vehicle 2A is also transmitted as a destination.

In S25, the vehicle 2A receives an instruction to execute provision of a temporary dwelling as an emergency service from the center server 1 (FIG. 9, OP310: YES), and unfolds a temporary dwelling module as a temporary dwelling provision service. Since the current position of the vehicle 2A is designated as the destination, the vehicle 2A does not move at that time.

As illustrated in FIG. 10, when an emergency has occurred and communication between the vehicle 2A and the center server 1 is maintained, the vehicle 2A can be first caused to complete one emergency service and then the vehicle 2A can be caused to execute another emergency service.

Figure 11:
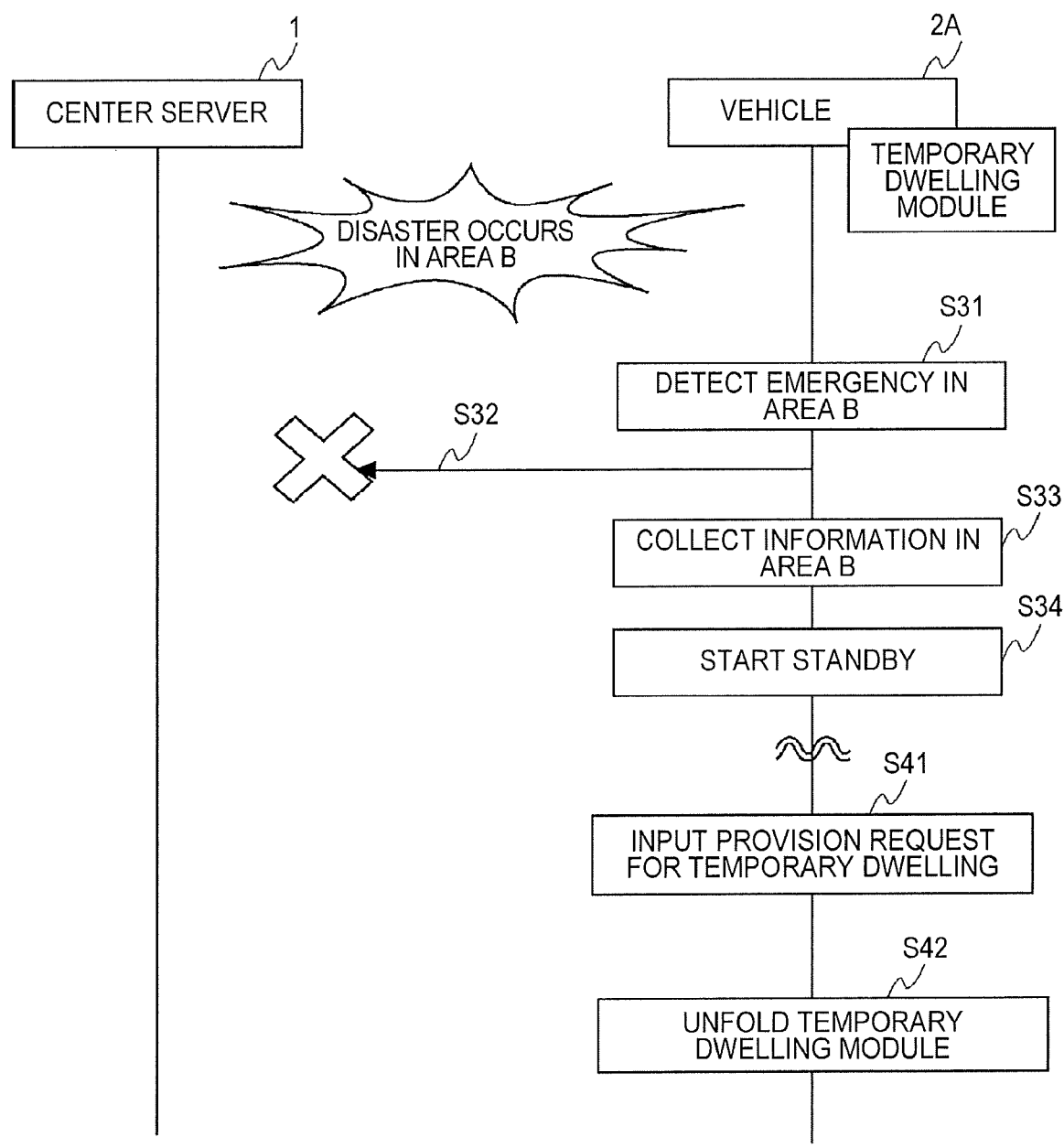
FIG. 11 is a diagram illustrating an example of a sequence of processes in the emergency support control system.

FIG. 11 is a diagram illustrating another example of a sequence of processes in the emergency support control system 100. FIG. 11 is based on the same premise as FIG. 10. That is, in FIG. 11, the vehicle 2A can perform transportation of resources and provision of a temporary dwelling as emergency services and is located in area B. In FIG. 11, it is also assumed that a natural disaster has occurred in area B.

In S31, the vehicle 2A is located in area B and detects an emergency which has occurred in area B based on data which is acquired using the environmental sensor 217 mounted in the vehicle 2A (FIG. 9, OP301: YES). In S32, the vehicle 2A transmits a notification indicating occurrence of an emergency to the center server 1 (FIG. 9, OP302). However, in FIG. 11, communication between the vehicle 2A and the center server 1 is cut off due to a problem in a relay base station or the like, a notification from the vehicle 2A to the center server 1 has not yet arrived, and an instruction to execute an emergency service of the vehicle 2A has not been received from the center server 1 (FIG. 9, OP303: NO). In FIG. 11, it is assumed that the communication function of the vehicle 2A is still available (FIG. 9, OP305: YES).

In S33, the vehicle 2A collects information on the emergency which has occurred in area B (FIG. 9, OP306). In S34, it is assumed that there is no emergency service which can be executed by the vehicle 2A (FIG. 9, OP307: NO) and the vehicle 2A is in a standby state (FIG. 9, OP309). The vehicle 2A displays options of a request for an emergency service on the display 207 with a touch panel which is provided in the vehicle 2A, for example, in the standby state. The options of a request for an emergency service include a resource transportation service and a temporary dwelling provision service which can be executed by the vehicle 2A.

In S41, since the options of a request for an emergency service are displayed on the display 207 with a touch panel of the vehicle 2A, an operation of selecting the temporary dwelling provision service is input from the options of a request for an emergency service by a user. In S42, for example, the vehicle 2A unfolds a temporary dwelling module and executes the temporary dwelling provision service. In S42, when the vehicle 2A cannot execute a temporary dwelling provision service, the vehicle 2A may broadcast information on a request for provision of a temporary dwelling, for example, by vehicle-to-vehicle communication and notify other nearby vehicles 2 of a request.

In the example illustrated in FIG. 11, even when communication between the vehicle 2A and the center server 1 has been cut due to occurrence of an emergency, the vehicle 2A can autonomously determine execution of an emergency service alone. The vehicle 2A may execute an emergency service in response to a manual input from a user.

Operations and Advantages of First Embodiment

In the first embodiment, when an emergency has occurred, vehicles 2 which are located in an occurrence position of the emergency and in the vicinity thereof stop normal services and start execution of emergency services. Accordingly, it is possible to effectively utilize the vehicles 2 which are autonomously traveling. Since the vehicles 2 are located in the occurrence position of the emergency and in the vicinity thereof, it is possible to provide the emergency services for the emergency to a disaster area more rapidly.

In the first embodiment, a vehicle 2 switches the normal service to an emergency service in accordance with an instruction from the center server 1. Since the center server 1 collects information from more information sources and ascertains damage statuses in a broader range, it is possible to provide appropriate emergency services to appropriate positions at which the corresponding emergency services have been requested by causing the center server 1 to assign the emergency services to vehicles 2.

In the first embodiment, when communication with the center server 1 has been cut off, a vehicle 2 may autonomously collect information and switch the normal service to a predetermined emergency service. Accordingly, even when the vehicle 2 cannot communicate with the center server 1, the vehicle 2 can provide an emergency service.

Other Embodiments

The above-mentioned embodiment is only an example and the disclosure can be appropriately modified without departing from the gist thereof.

A vehicle 2 may perform a process of switching a normal service to an emergency service at the time of occurrence of an emergency, for example, alone, not in cooperation with the center server 1 as in the first embodiment. For example, the vehicle 2 may achieve the process by performing the processes of OP301 and OP306 to OP309 in FIG. 9. Specifically, the vehicle 2 collects information (OP306) when occurrence of an emergency has been detected (OP301: YES), executes an emergency service (OP308) when there is an emergency service which can be executed by the host vehicle (OP307: YES), and executes a standby service or a prescribed emergency service (OP309) when there is no emergency service which can be executed by the host vehicle (OP307: NO).

The processes or means which have been described above in the present disclosure can be freely combined unless any technical conflict occurs.

A process which has been described to be performed by a single device may be distributed to and performed by a plurality of devices. Alternatively, processes which have been described to be performed by different devices may be performed by a single device. In a computer system, by what hardware configuration (server configuration) each function is to be embodied can be flexibly changed.

The disclosure can also be embodied by supplying a computer program storing the functions described above in the above-mentioned embodiment to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a blue-ray disc), and an arbitrary type of medium which is suitable for storing electronic commands such as a read only memory (ROM), a random access memory (RAM), an EPROM, an EEPROM, a magnetic card, a flash memory, an optical card.

What is claimed is:

1. A vehicle that is able to travel autonomously, the vehicle comprising:
   circuitry configured to:
   detect an occurrence of an emergency;
   transmit a notification to a server that manages emergency, the notification indicating the occurrence of the emergency;
   determine whether an instruction to execute an emergency service of emergency support has been received from the server in response to the notification;
   when the instruction to execute the emergency service has been received from the server:
     stop a first service and execute the emergency service, and
     execute movement to a predetermined position associated with the emergency service; and
   when the instruction to execute the emergency service has not been received from the server:
     determine a second service of emergency support,
     stop the first service and execute the second service, and
     execute movement to a predetermined position associated with the second service.

2. The vehicle according to claim 1, further comprising a sensor that detects a surrounding environment, wherein the circuitry is configured to detect the occurrence of the emergency from data acquired by the sensor.

3. The vehicle according to claim 1, wherein the server manages emergency support in a predetermined range.

4. The vehicle according to claim 3, wherein the instruction to execute the emergency service has not been received because communication with the server is cut off.

5. The vehicle according to claim 1, wherein the circuitry is configured to execute a third service of emergency support, which is requested from the predetermined position and is to be executed by the vehicle, when the second service ends.

6. A system comprising:
   an information processing device, and
   a plurality of vehicles which are able to travel autonomously, wherein
   the information processing device includes circuitry configured to:
     detect an occurrence of an emergency;
     determine an area and a scale of the emergency based upon a plurality of sources; and
     instruct the plurality of vehicles, which are located in a predetermined range including the area, to stop a first service which is being executed and to execute a second service of emergency support,
   the plurality of vehicles each include circuitry configured to execute movement to a predetermined position associated with the second service, and
   the circuitry of the information processing device is configured to determine the scale of the emergency based upon a number of collapsed dwellings.

7. The system according to claim 6, wherein the circuitry of the information processing device is configured to instruct the plurality of vehicles to execute a third service of emergency support, which is requested from a vicinity of the area and is able to be executed by the vehicles, when the second service ends.

8. An emergency support method of causing a vehicle, which is able to travel autonomously, to perform:
   detecting an occurrence of an emergency;
   transmitting a notification to a server that manages emergency, the notification indicating the occurrence of the emergency;
   determining whether an instruction to execute an emergency service of emergency support has been received from the server in response to the notification;
   when the instruction to execute the emergency service has been received from the server:
     stopping a first service and executing the emergency service, and
     executing movement to a predetermined position associated with the emergency service; and
   when the instruction to execute the emergency service has not been received from the server:
     determining a second service of emergency support,
     stopping the first service and execute the second service, and
     executing movement to a predetermined position associated with the second service.

9. A method comprising:
   detecting occurrence of an emergency;
   determining an area and a scale of the emergency based upon a plurality of sources including determining the scale of the emergency based upon a number of collapsed dwellings;

instructing a plurality of vehicles, which are able to travel autonomously and which are located in a predetermined range including the area, to stop a first service which is being executed and to execute a second service of emergency support; and causing the plurality of vehicles to execute movement to a predetermined position associated with the second service.

10. The system according to claim 6, wherein the circuitry of the information processing device is configured to detect the occurrence of the emergency based upon receipt of emergency news received from a predetermined public institution or a predetermined news medium.

11. The system according to claim 6, wherein the circuitry of the information processing device is configured to determine the area and the scale of the emergency based upon a plurality of notifications of the emergency received from multiple vehicles and emergency information issued from a predetermined public institution or a predetermined news medium.

12. The system according to claim 6, wherein the circuitry of the information processing device is configured to instruct the plurality of vehicles to stop the first service which is being executed and to execute the second service of emergency support when the scale of the emergency is greater than a predetermined threshold and a number of requests for emergency support is greater than a predetermined number.

13. The vehicle according to claim 1, wherein the circuitry is configured to, when the instruction to execute the emergency service has not been received from the server:
 collect information associated with the emergency from another vehicle; and
 determine the second service based on the information collected from the other vehicle and information of a module which is mounted in the vehicle.

14. The vehicle according to claim 1, wherein the circuitry is configured to, when the instruction to execute the emergency service has not been received from the server:
 collect information associated with the emergency from a different server; and
 determine the second service based on the information collected from the different server and information of a module which is mounted in the vehicle.

* * * * *